United States Patent
Kruse et al.

(10) Patent No.: US 10,939,667 B2
(45) Date of Patent: Mar. 9, 2021

(54) GUIDE DOG HARNESS APPARATUS FOR THE BLIND AND VISUALLY IMPAIRED

(71) Applicant: Ruff Wear, Inc., Bend, OR (US)

(72) Inventors: Patrick Kruse, Bend, OR (US); Colin Tisdale, Bend, OR (US); Timothy Gorbold, Bend, OR (US)

(73) Assignee: Ruff Wear, Inc., Bend, OR (US)

( * ) Notice: Subject to any disclaimer, the term of this patent is extended or adjusted under 35 U.S.C. 154(b) by 410 days.

(21) Appl. No.: 15/996,017

(22) Filed: Jun. 1, 2018

(65) Prior Publication Data

US 2019/0364850 A1 Dec. 5, 2019

(51) Int. Cl.
*A01K 27/00* (2006.01)

(52) U.S. Cl.
CPC .......... *A01K 27/005* (2013.01); *A01K 27/002* (2013.01)

(58) Field of Classification Search
CPC ..... A01K 27/00; A01K 27/002; A01K 27/005
USPC .......................................... 119/792, 795, 799
See application file for complete search history.

(56) References Cited

U.S. PATENT DOCUMENTS

| | | | |
|---|---|---|---|
| 1,942,447 A * | 1/1934 | Prescott | B62D 55/32 72/392 |
| 2,026,383 A | 10/1934 | Gyulay | |
| 2,233,397 A | 3/1941 | Bloom | |
| 2,437,628 A | 3/1948 | Warren | |
| 2,491,951 A | 12/1949 | Buettner | |
| 2,645,284 A | 7/1953 | Lundstrom | |
| 2,845,064 A | 7/1958 | Walsh | |
| 3,435,867 A | 4/1969 | Hyden | |
| 3,769,939 A | 11/1973 | Wais et al. | |
| 3,884,403 A | 5/1975 | Brewer | |
| 4,114,352 A | 9/1978 | Horton | |
| 4,329,942 A | 5/1982 | King | |
| 4,355,600 A | 10/1982 | Zielinski | |
| 4,530,309 A | 7/1985 | Collins | |
| 4,530,310 A * | 7/1985 | Clarke | A01K 27/005 119/776 |
| 4,577,591 A | 3/1986 | Wesseldine | |
| D313,677 S | 1/1991 | Hammon | |
| 5,154,660 A | 10/1992 | Snyder et al. | |
| 5,184,762 A | 2/1993 | Nevitt | |
| 5,485,810 A | 1/1996 | Sporn | |

(Continued)

FOREIGN PATENT DOCUMENTS

EP 2540159 A1 1/2013

*Primary Examiner* — David J Parsley
(74) *Attorney, Agent, or Firm* — Hancock Hughey LLP

(57) ABSTRACT

A guide dog apparatus comprises a form fitting guide dog harness, an extensible and rotatable human guiding handle, and a single point attachment mechanism connecting the dog harness and human guiding handle. The harness includes a dorsal panel and a ventral panel. A user handle is connected to an attachment member that is mounted to the dorsal panel of the harness and which includes a clamping gudgeon that retains a pintle attached to the handle in a desired orientation. The apparatus positively couples linear guiding forces in the ventral, dorsal, cranial, and caudal directions. The guiding handle attachment positively couples rotational guiding forces about the vertical dorsoventral axis and the horizontal anteroposterior axis. Freedom of rotation is provided about the lateral horizontal left-right axis. The user is able to laterally adjust the distance between grip and the harness.

18 Claims, 11 Drawing Sheets

(56) References Cited

U.S. PATENT DOCUMENTS

| | | |
|---|---|---|
| D372,563 S | 8/1996 | Waugh, Jr. |
| D379,686 S | 6/1997 | Caditz |
| 5,644,902 A | 7/1997 | Kemp |
| 5,660,146 A | 8/1997 | Sporn |
| D383,255 S | 9/1997 | Caditz |
| 5,682,840 A | 11/1997 | Mcfarland |
| 5,887,772 A | 3/1999 | Dooley |
| 5,896,831 A | 4/1999 | Alpert |
| D404,852 S | 7/1999 | Powell-Lesnick |
| 5,918,611 A | 7/1999 | Amato |
| 5,970,921 A | 10/1999 | Fulton |
| 5,996,537 A | 12/1999 | Caditz |
| 6,213,057 B1 | 4/2001 | Franco et al. |
| 6,314,915 B1 | 11/2001 | Pope |
| 6,408,799 B1 | 6/2002 | Franck |
| 6,484,480 B2 | 11/2002 | Rauch |
| 6,571,745 B2 | 6/2003 | Kerrigan |
| D480,843 S | 10/2003 | Sullivan |
| 6,662,755 B2 | 12/2003 | Kato |
| 6,679,198 B1 | 1/2004 | Lagarde |
| 6,796,274 B1 | 9/2004 | Maynihan |
| 6,971,476 B2 | 12/2005 | Wolner et al. |
| 7,021,246 B2 | 4/2006 | Seymour |
| 7,107,939 B2 | 9/2006 | Linda, Jr. |
| 7,140,326 B2 | 11/2006 | Jenny |
| 7,160,167 B2 | 1/2007 | Peters |
| 7,243,485 B2 | 7/2007 | Donahue |
| 7,281,363 B2 | 10/2007 | Woerner |
| 7,325,516 B2 | 2/2008 | Moore |
| 7,343,881 B2 | 3/2008 | Schantz et al. |
| 7,370,608 B1 | 5/2008 | Friedman |
| 7,387,087 B2 | 6/2008 | Linda |
| 7,434,541 B2 | 10/2008 | Kates |
| 7,757,641 B1 | 7/2010 | Vonn Worden |
| 7,793,619 B2 | 9/2010 | Kajanoff |
| 7,886,699 B2 | 2/2011 | Lady, Jr. |
| 7,891,322 B2 | 2/2011 | Bennett et al. |
| 8,166,924 B2 | 5/2012 | Cho |
| 8,171,891 B2 | 5/2012 | Rubinstein et al. |
| 8,181,608 B2 | 5/2012 | Reese |
| 8,210,131 B2 | 7/2012 | Friedland |
| 8,261,699 B2 | 9/2012 | Cho |
| 8,312,599 B2 | 11/2012 | Vogl |
| 8,360,009 B2 | 1/2013 | Rubinstein et al. |
| 8,561,577 B1 | 10/2013 | Paxton |
| 8,627,788 B2 | 1/2014 | Gyula |
| 8,869,750 B2 | 10/2014 | Lady |
| 9,089,109 B2 | 7/2015 | Codos |
| D745,748 S | 12/2015 | Tacker-Betancourt |
| 9,370,166 B1 | 6/2016 | Ford |
| 9,439,399 B2 | 9/2016 | Rubinstein et al. |
| 9,456,586 B1 | 10/2016 | Lady |
| 9,468,195 B2 | 10/2016 | Blizzard et al. |
| 9,554,558 B2 | 1/2017 | Potts-Mangini |
| 9,565,836 B2 | 2/2017 | Conley |
| 9,609,850 B2 * | 4/2017 | Lajoie ............... A01K 27/005 |
| 9,744,937 B1 | 8/2017 | Leung et al. |
| 9,795,117 B1 | 10/2017 | Grant |
| 10,383,313 B2 * | 8/2019 | Bartol ............... A01K 27/005 |
| 2002/0121248 A1 | 9/2002 | Rooks |
| 2004/0000273 A1 | 1/2004 | Lady |
| 2004/0134447 A1 | 7/2004 | Seymour |
| 2005/0072376 A1 | 4/2005 | Kerrigan |
| 2005/0145202 A1 * | 7/2005 | Bonner ............... A01K 27/003 |
| | | 119/792 |
| 2005/0263101 A1 | 12/2005 | Jenny |
| 2005/0263102 A1 | 12/2005 | Sherman |
| 2006/0037562 A1 | 2/2006 | Woerner |
| 2006/0090711 A1 | 5/2006 | Richards |
| 2006/0102102 A1 | 5/2006 | Bennett |
| 2006/0156997 A1 | 7/2006 | Moore |
| 2006/0243220 A1 | 11/2006 | Lady |
| 2006/0254534 A1 | 11/2006 | Lin |
| 2007/0044735 A1 | 3/2007 | Zimmerman |
| 2007/0204803 A1 | 9/2007 | Ramsay |
| 2007/0215065 A1 | 9/2007 | Furlich |
| 2008/0047501 A1 | 2/2008 | Madere |
| 2008/0190380 A1 | 8/2008 | Lady |
| 2008/0216767 A1 | 9/2008 | Xiao |
| 2008/0276876 A1 | 11/2008 | Hill |
| 2008/0289586 A1 | 11/2008 | O'Connor |
| 2009/0007855 A1 | 1/2009 | Alexander |
| 2009/0159014 A1 | 6/2009 | Olenick |
| 2009/0205586 A1 | 8/2009 | Matthews |
| 2009/0314224 A1 | 12/2009 | Rubinstein |
| 2010/0199927 A1 | 8/2010 | Cigard et al. |
| 2010/0212269 A1 | 8/2010 | Lucia Santa |
| 2010/0251972 A1 | 10/2010 | Lady |
| 2010/0263602 A1 | 10/2010 | Hyeon |
| 2010/0294213 A1 | 11/2010 | Ferplast |
| 2010/0313825 A1 | 12/2010 | Friedland |
| 2011/0174237 A1 | 7/2011 | Sanders-Luckman |
| 2011/0197824 A1 | 8/2011 | Reese |
| 2011/0226193 A1 | 9/2011 | Williams |
| 2011/0308479 A1 | 12/2011 | Kuo |
| 2012/0180735 A1 | 7/2012 | Rubinstein et al. |
| 2012/0199081 A1 | 8/2012 | Daye |
| 2013/0014705 A1 | 1/2013 | Hyeon |
| 2013/0276720 A1 | 10/2013 | Ferrando |
| 2014/0224189 A1 | 8/2014 | Hamilton |
| 2014/0251235 A1 | 9/2014 | Codos |
| 2015/0007528 A1 | 1/2015 | Landrith |
| 2015/0107532 A1 * | 4/2015 | Shaver ............... A01K 27/003 |
| | | 119/792 |
| 2016/0015003 A1 | 1/2016 | Watson et al. |

* cited by examiner

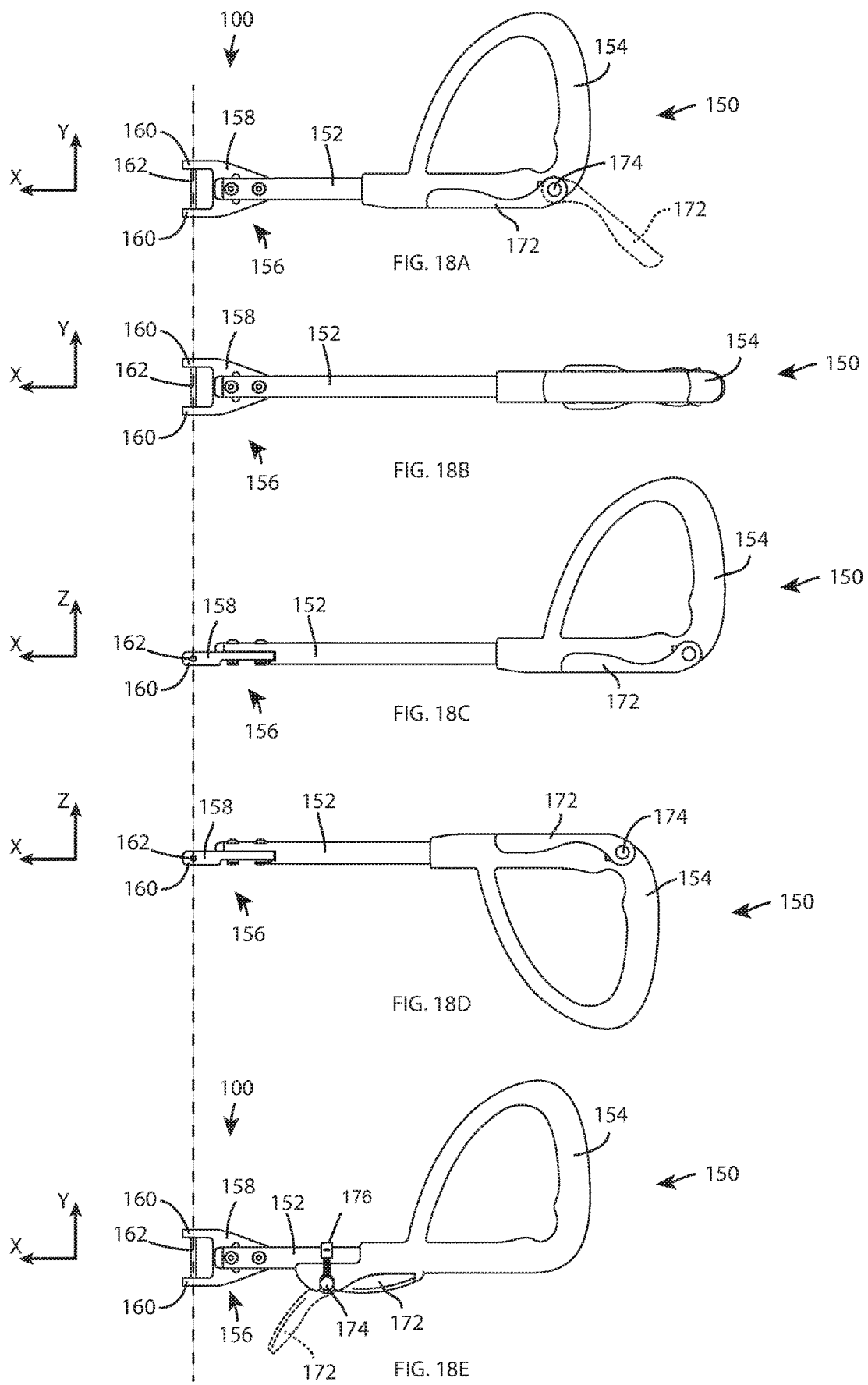

US 10,939,667 B2

GUIDE DOG HARNESS APPARATUS FOR THE BLIND AND VISUALLY IMPAIRED

FIELD OF THE INVENTION

The present invention relates to an apparatus for use by the blind and visually impaired, and more specifically relates to a harness for use with guide dogs that provides significantly improved and greater control and connectedness between the handler and the guide dog.

BACKGROUND INFORMATION

Globally, an estimated 253 million people live with vision impairment. Of those, approximately 36 million are blind and 217 million have moderate to severe vision impairment. In the United States, approximately 1.3 million people qualify as legally blind. Guide dogs are an important component of helping the blind community to be more mobile and independent. Guide dogs are renowned for their ability to assist and otherwise guide vision-impaired people through the tasks of normal living and the guide dog and the human make up a team that experience has shown to work remarkably well together to assist vision-impaired people with everyday life.

Worldwide, there are approximately 200,000 guide dogs in service with over 10,000 guide dogs working in the United States. The first known historical reference to the use of dogs to lead vision-impaired people was uncovered in the ruins of Pompeii. This reference dates back to 70 A.D. Guide dogs were used as early as the mid-$16^{th}$ century but guide dog training schools did not become prevalent until WWI in Germany to help with returning veterans. The first guide dog was used in the United States in 1928 and the total population of guide dogs has grown dramatically at the end of the last century and beginning of this one. Known harness systems in use with guide dogs were based on technology adapted from equestrian tack and farming tack.

Guide dogs today are typically trained in one of 92 certified schools in 30 countries around the world certified by the International Guide Dog Federation. The dogs are specifically bred, raised and trained as guide dogs and the trained dogs are paired with blind recipients. The dogs are trained to help their human safely navigate the world around them.

The main connection between a guide dog and their human companion is the "guide dog harness." There are many different types and styles of guide dog harnesses. The essential function of all such harnesses is to translate movement and behavior of the guide dog, through the harness, to the user to thereby communicate important information to the user. While there are many types of guide dog harnesses, there is a need for a harness that further improves the communication between the dog and the user to enhance the safety and precision of information that a guide dog can provide to the user through the extensive training that the dogs have.

The present invention is a guide dog harness that provides significant improvement to known harnesses and allows for increased and enhanced communication between the guide dog and the user.

BRIEF DESCRIPTION OF THE DRAWINGS

The invention will be better understood and its numerous objects and advantages will be apparent by reference to the following detailed description of the invention when taken in conjunction with the following drawings.

FIGS. 18A through 18D are a series of illustrations of the human guiding handle shown in isolation and in which the phantom line extending through all of the illustrations in the series shows the positional orientation of the handle in each figure. Specifically, FIG. 18A is a top plan view of the handle, illustrating the handle length adjustment in the minimum length position and the handle rotated to the zero-degree reference angle—for purposes herein the "zero-degree" reference angle is defined as the position shown in FIG. 18A.

FIG. 18B is a top plan view of the handle, illustrating the handle length adjustment in the maximum length position and the handle rotated 90 degrees counterclockwise relative to the handle position shown in FIG. 18A.

FIG. 18C is a side elevation view of the handle, illustrating the handle length adjustment in the maximum length position and rotated 180 degrees relative to the position of the handle shown in FIG. 18B.

FIG. 18D is a side elevation with the handle in the same position shown in FIG. 18B except with the length of the handle adjusted to the position about half way between minimum and maximum length positions.

18E is a top plan view of the handle, illustrating the handle length adjustment in the minimum length position and the handle rotated to the zero-degree reference angle, except illustrating an alternative handle locking mechanism from that shown in FIG. 18A.

Figure 19A:
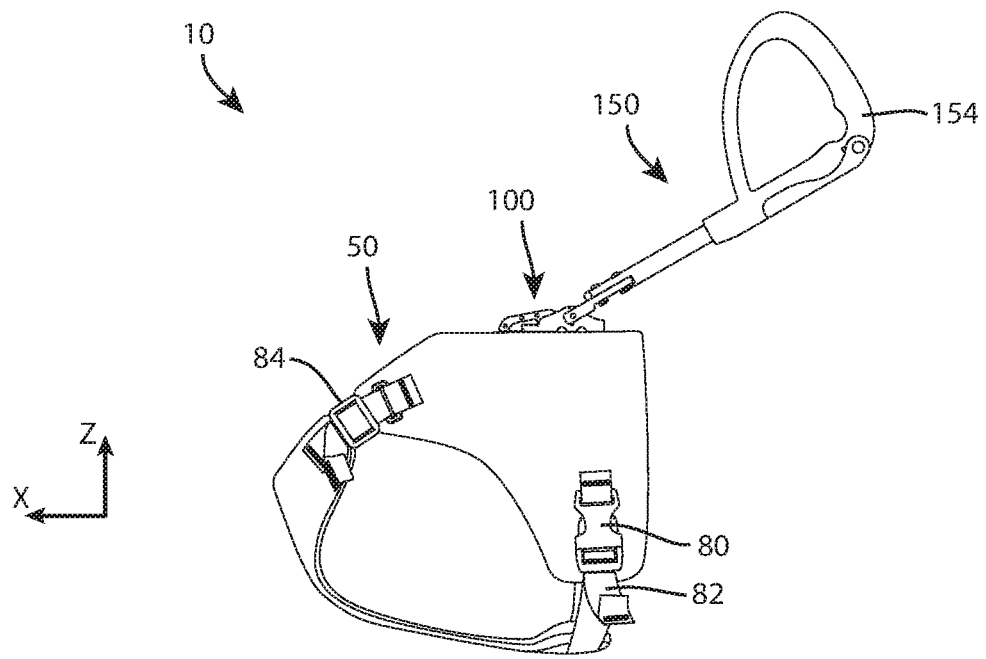

FIG. 19A is a side elevation view of the present invention showing the handle adjusted to the minimum length position and rotated to the 90 degree reference angle as shown in FIG. 18C.

Figure 19B:
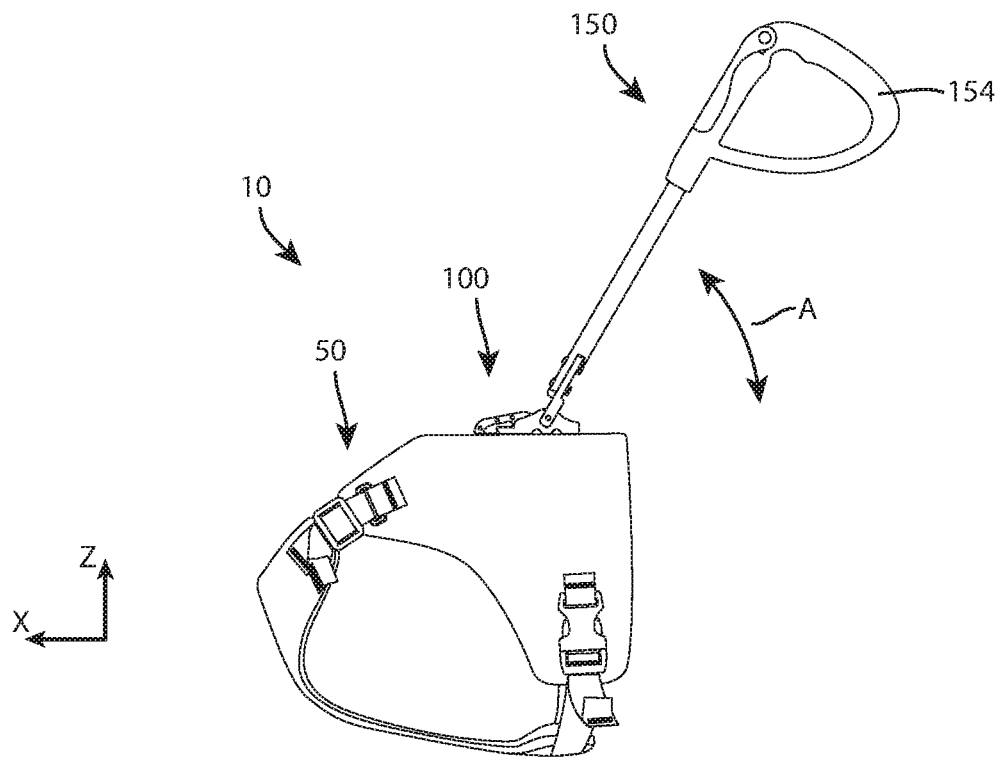

FIG. 19B is a side elevation view of the apparatus shown in FIG. 19A except illustrating the handle adjusted to the maximum length position, rotated 180 degrees relative to the handle rotation in FIG. 19A, and in a slightly elevated orientation relative to the ground plane.

Figure 20A:
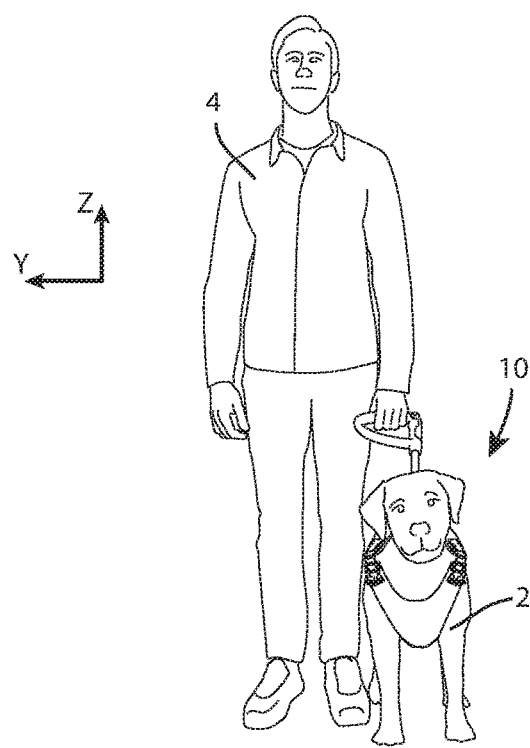

FIGS. 20A and 20B, and 21A and 21B are a series of views of the guide dog harness according to the present invention fitted onto a guide dog and illustrating a human user standing next to the guide dog to illustrate how the harness may be used by a human. Specifically, FIG. 20A is a front elevation view of the guide dog fitted with a harness according to the invention, and the human; in FIG. 20A the handle is shown in the zero-degree reference angle.

Figure 20B:
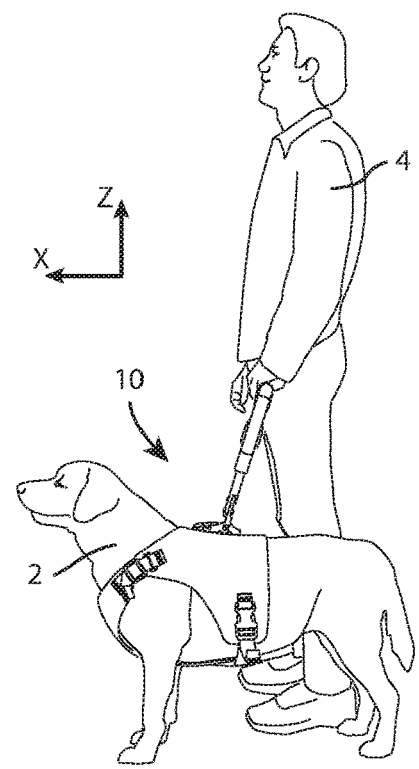

FIG. 20B is a left side elevation view of the guide dog harness and human shown in FIG. 20A.

Figure 21A:
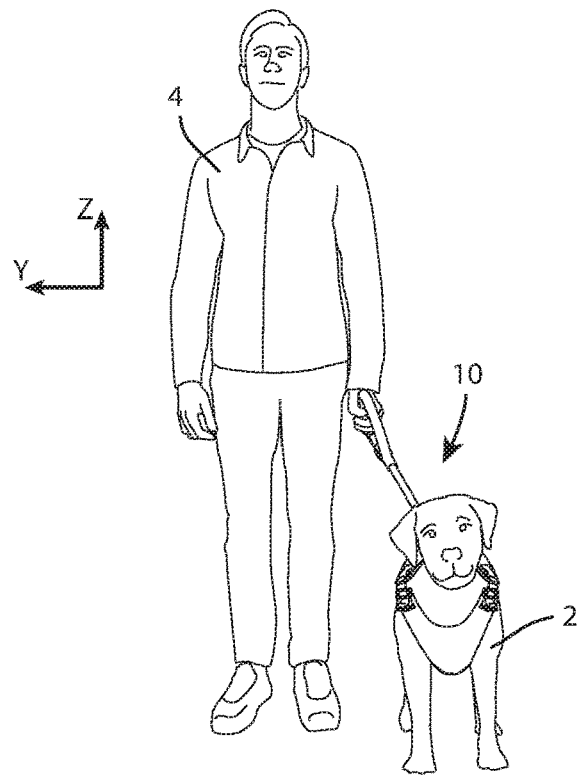

FIG. 21A is a front elevation view of the guide dog fitted with a harness according to the invention, and the human; in FIG. 21A the handle is shown in the ninety-degree reference angle but the handle angle has been varied relative to that shown in FIG. 20A.

Figure 21B:
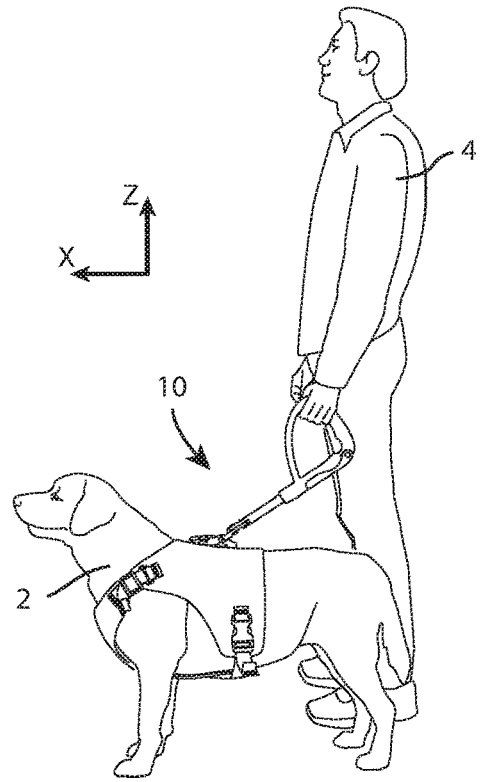

FIG. 21B is a left side elevation view of the guide dog harness and human shown in FIG. 21A.

DETAILED DESCRIPTION OF THE ILLUSTRATED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
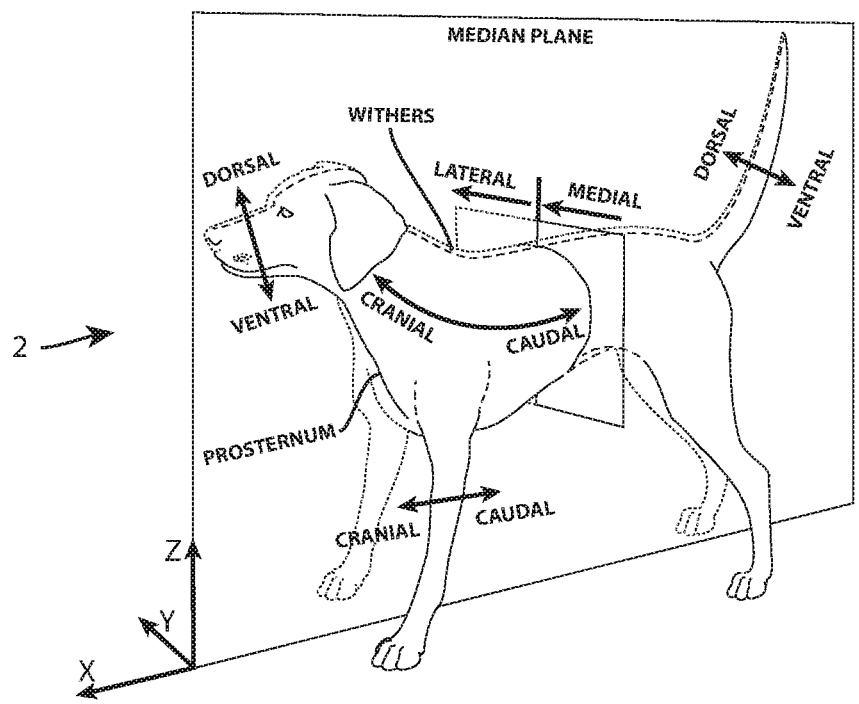
FIG. 1 is a front left perspective view of a canine body with directions and orientations illustrated for the purpose of establishing common language to better communicate and understand the invention.
Figure 2:
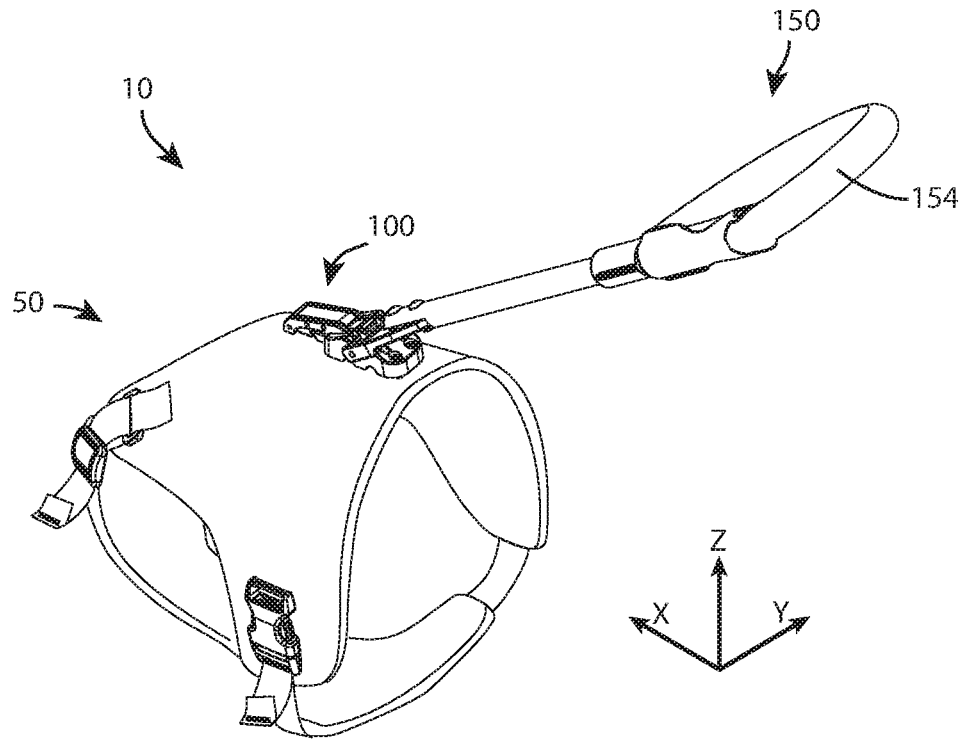
FIG. 2 is a top perspective and left, rear side view of a guide dog harness according to the invention and which incorporates a form fitting guide dog harness and an extensible and rotatable human guiding handle, and including a single point quick attachment mechanism connecting the guide dog harness and human guiding handle.
Figure 3:
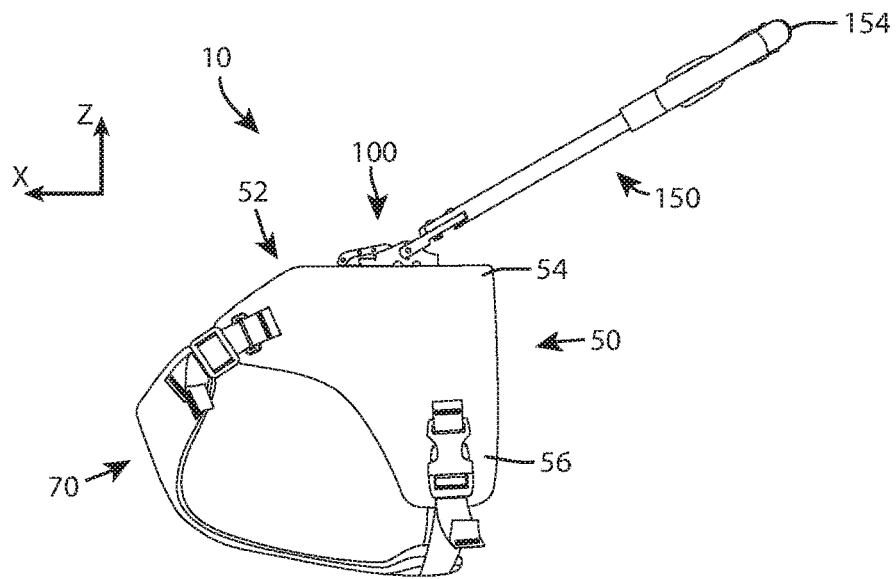
FIG. 3 is a left side elevation view of the guide dog harness apparatus as shown in FIG. 2.
Figure 4:
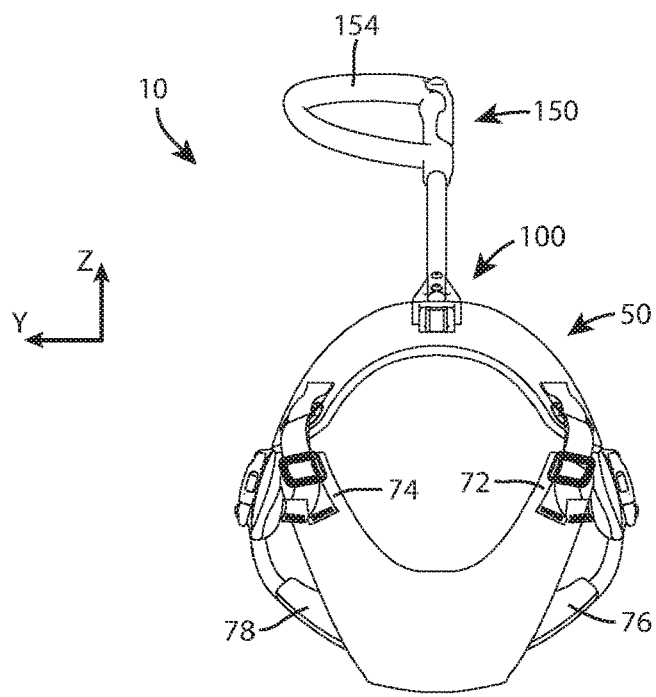
FIG. 4 is a front elevation view of the guide dog harness apparatus as shown in FIG. 2.
Figure 5:
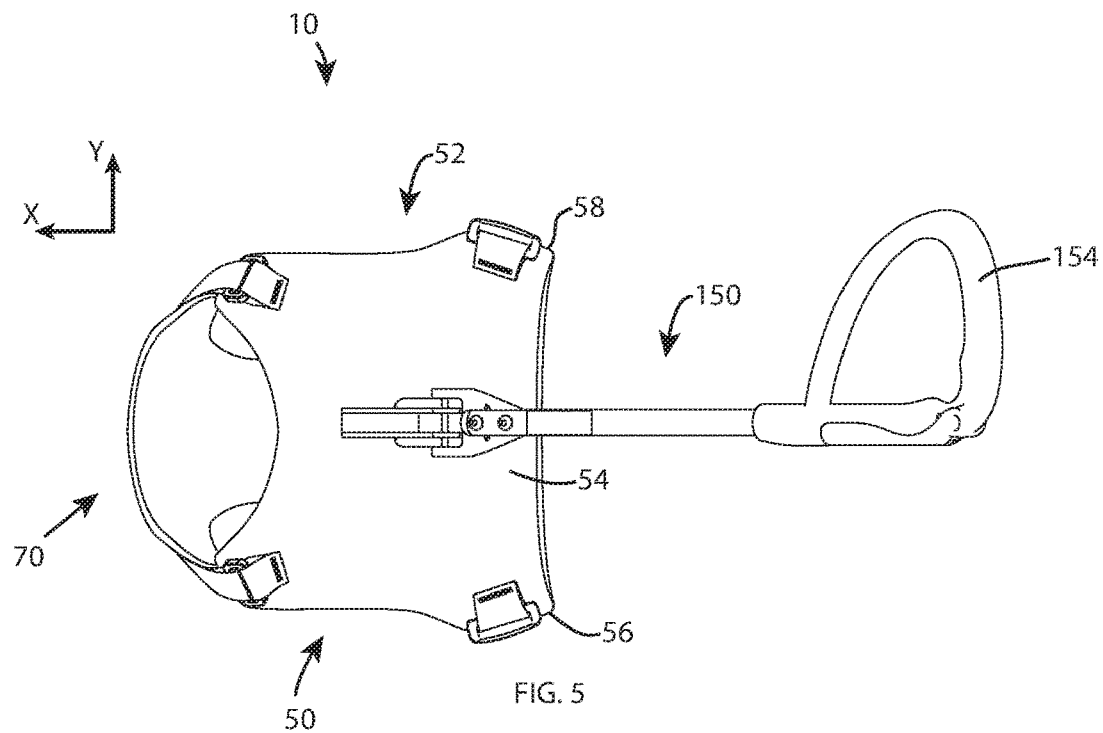
FIG. 5 is a top plan view of the guide dog harness apparatus as shown in FIG. 2.
Figure 6:
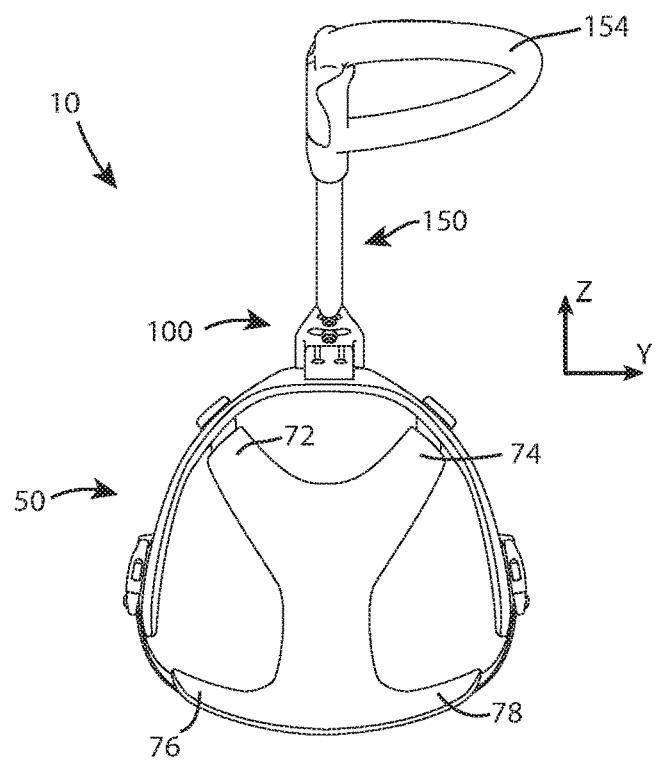
FIG. 6 is a rear elevation view of the guide dog harness apparatus as shown in FIG. 2.

With reference now to the drawings, FIG. 1 is provided as reference to define commonly accepted terms for orientation and direction associated with a canine body and as used at times herein to describe the guide dog harness apparatus 10. The X-Y-Z and X-Y coordinate graphs used in the drawings such as FIGS. 2, 11, 12, 15, etc. are intended to define a directional naming convention and for defining directional terms used at times in this description. With reference to FIG. 2, the X-Y plane is defined as a plane that is parallel to a horizontal ground plane, for instance, the ground surface on which the dog 2 and human 4 in FIG. 20A are standing. The Z direction is upward and normal relative to the X-Y plane. With reference to the dog shown in FIG. 1, the X direction is parallel to the longitudinal, major axis extending in the direction from the dog's head to its tail, and vice versa. Y is transverse to X and Z is the direction of the vertical plane. Other directional terms used herein follow this naming convention: for instance, "downward" is in the direction opposite the Z direction, "inward" is the direction toward the interior of the dog, outward is the direction from the interior of the dog toward the dog's exterior, etc. The dog is identified with reference number 2, and the human that is being guided by the dog 2 is identified with reference number 4. For purposes of a naming convention relating to the rotational orientation of the handle 150, the terms clockwise and counterclockwise are used. These terms are defined by the view of the dog 2 from the dog's head looking toward the dog's tail.

FIGS. 2 through 6 and other figures illustrate the complete guide dog harness apparatus 10 according to the invention from multiple view angles. The harness 10 comprises three major components: a dog harness 50, a handle attachment mechanism 100, and an adjustable human guiding handle 150. Each of these components and the manner in which they are used are described in detail beginning with the dog harness 50.

Figure 7B:
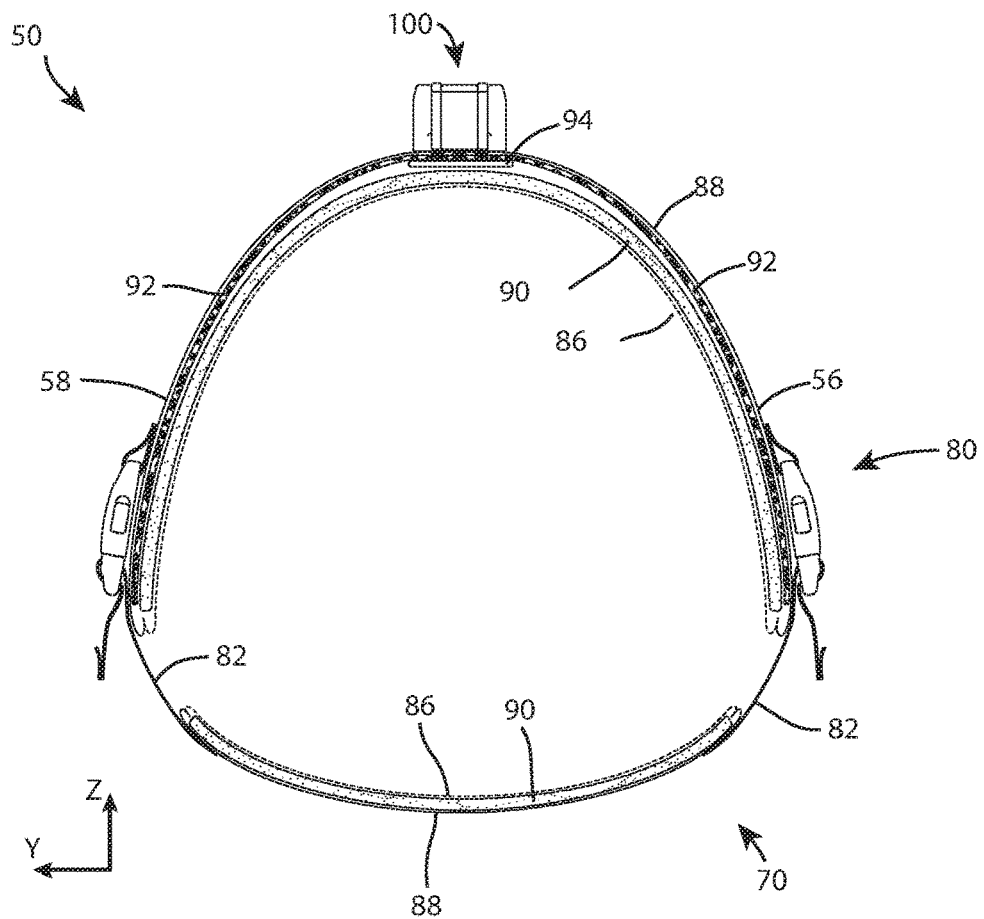
FIG. 7B is a cross sectional view taken along the line A-A of FIG. 7A.
Figure 7A:
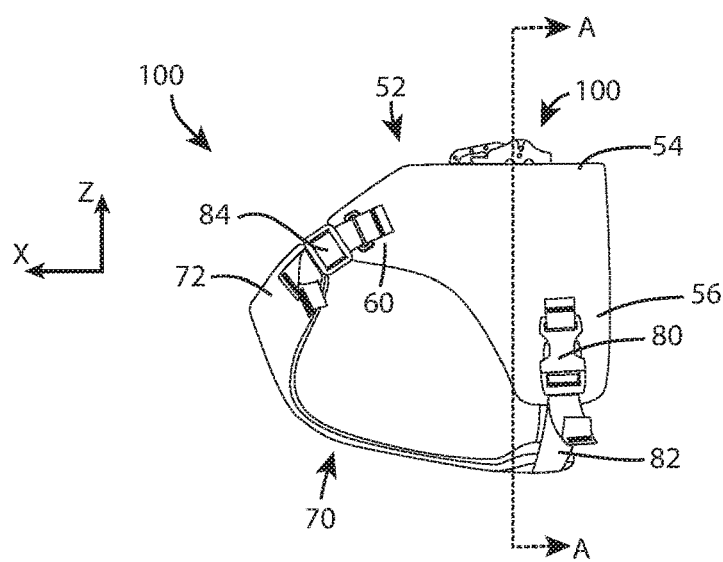
FIG. 7A is a side elevation view of the form fitting guide dog harness shown in isolation with the human guiding handle detached, illustrating the shaped dorsal panel and single point quick release mechanism location and adjustable strap configuration for optimizing harness fit on the guide dog.
Figure 8:
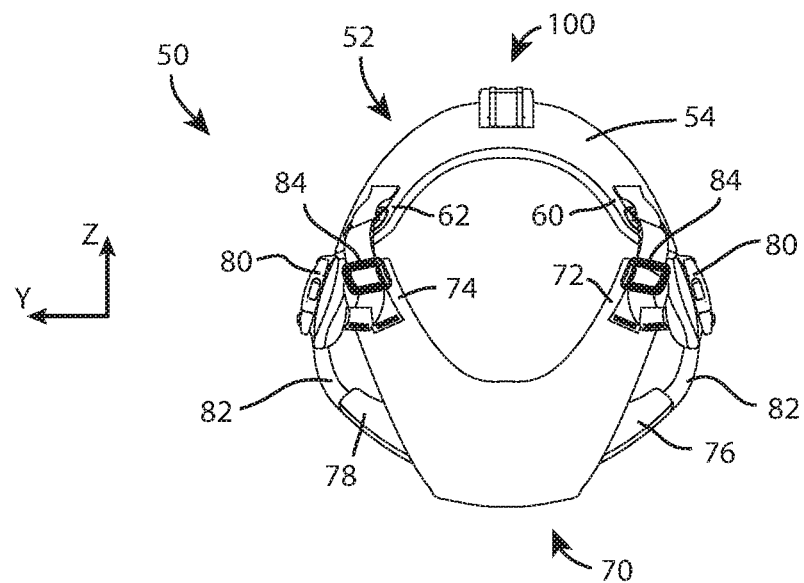
FIG. 8 is a front elevation view of the form fitting guide dog harness shown in FIG. 7A, illustrating the shaped ventral panel and shaped dorsal panel with adjustable strap configuration for optimizing harness fit on the guide dog and single point quick release mechanism location.
Figure 9:
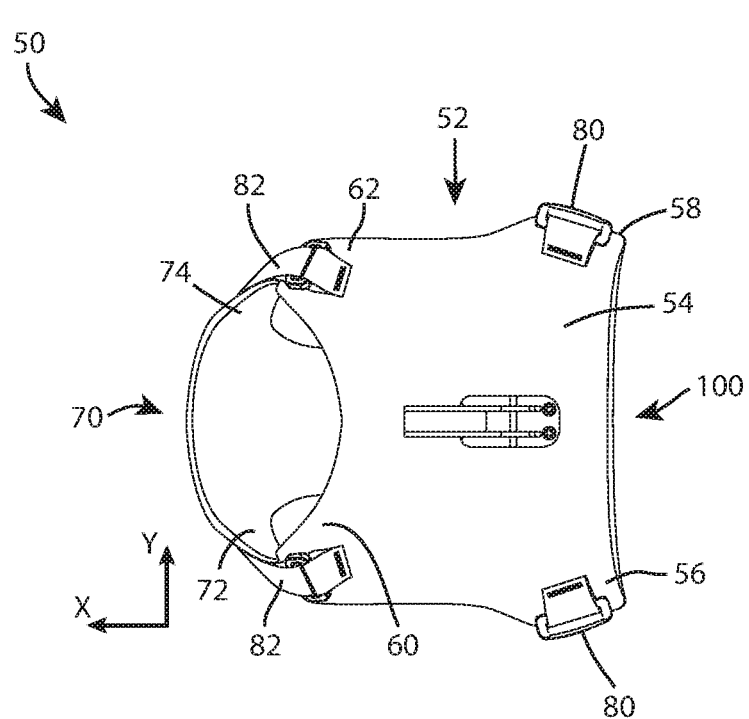
FIG. 9 is a top plan view of the form fitting guide dog harness shown in FIG. 7A, illustrating the shaped dorsal panel with single point quick release mechanism, shaped ventral panel and the adjustable strap configuration for optimizing harness fit.
Figure 10:
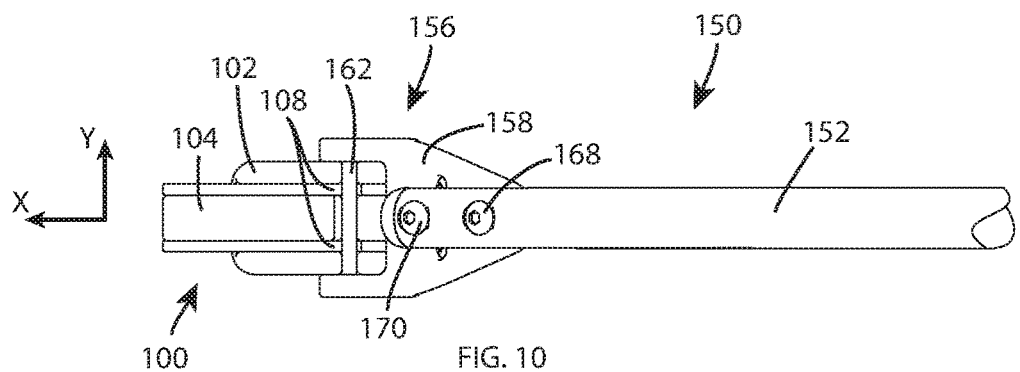
FIG. 10 is a top plan view of the quick release clamp mechanism that attaches the handle to the harness and a portion of the handle, shown in isolation, and in which the mechanism is in an unclamped position and the handle attachment pintle is aligned as it would be prior to attachment.
Figure 11:
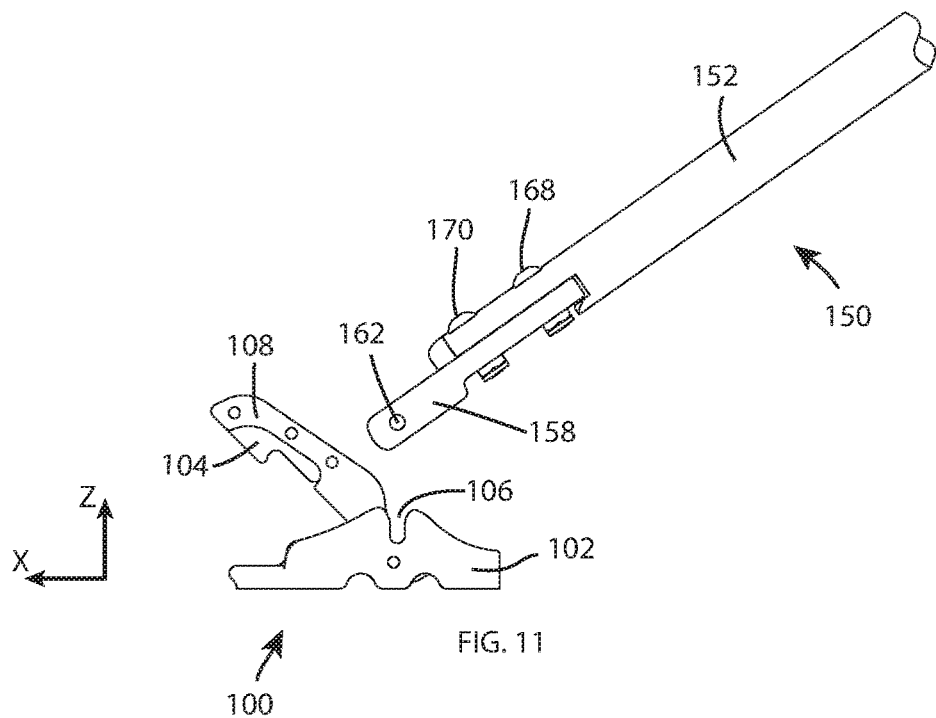
FIG. 11 is a left side elevation view of the clamping mechanism and handle shown in FIG. 10.
Figure 12:
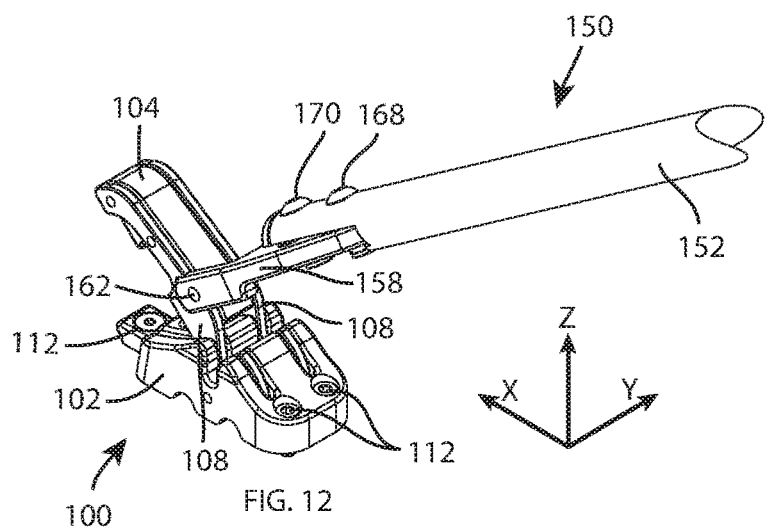
FIG. 12 is a top perspective and left, rear side view of the clamping mechanism and handle shown in FIG. 10.
Figure 13:
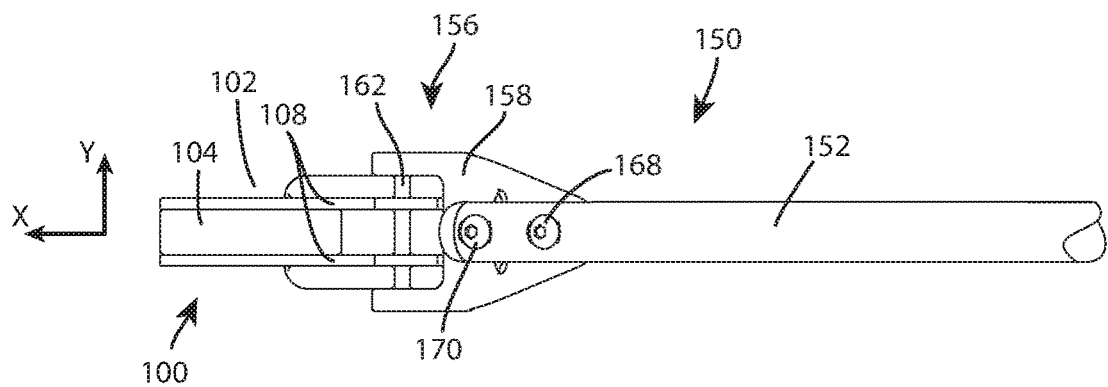
FIG. 13 is a top plan view of the clamp mechanism and handle similar to the view of FIG. 10 except that in FIG. 13 the mechanism is in a clamped position with the handle attachment pintle attached to the clamp mechanism.
Figure 14:
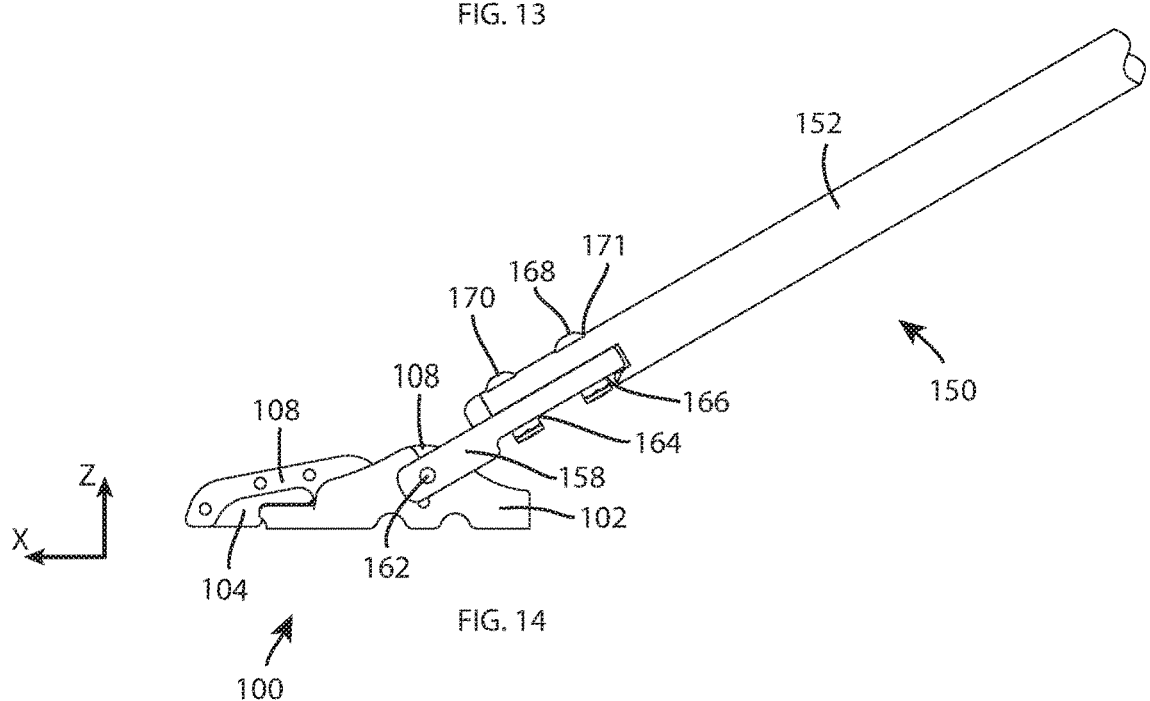
FIG. 14 is a left side elevation view of the clamping mechanism and handle shown in FIG. 13.

The dog harness 50 is shown in isolation in FIGS. 7 through 9 from multiple view angles to illustrate the details of the harness. The harness 50 is the component of the apparatus 10 that is "worn" by the dog 2; the adjustable human guiding handle 150 defines the interconnection between the dog and the human (via the harness); and the single point attachment mechanism 100 defines the interconnection between the harness 50 and the handle 150. Generally described and with specific reference to FIGS. 7A, 8 and 9, the harness 50 is a bilaterally symmetrically shaped device that is designed to comfortably and snugly conform to the body of the guide dog 2 on which the harness is worn. More specifically, guide dog harness 50 comprises a shaped dorsal panel 52 that extends over the dog's back, extending from the dorsal base of the dog's neck to a location posterior of the withers (FIG. 1). With reference to FIGS. 7A and 7B the dorsal panel 52 has a back portion 54 and opposed side portions 56 and 58 that extends downwardly from the back portion 54 and which correspond, generally when worn on the dog, to the sides of the harness. Thus, when the harness 50 is fitted onto a dog, the back portion 54 rests on the dog's back and the side portions 56 and 58 conform to the dog's sides rearward (i.e., caudal or posteriorly) of the dog's forearms as shown in FIG. 20B. The opposite anterior and forwardly extending corners of dorsal panel 50 are identified with reference numbers 60 and 62, respectively.

Harness 50 further includes a shaped ventral panel 70 that when fitted to a dog extends from the prosternum, along the chest centerline, to a position anterior or caudal of the forearms. The ventral panel 70 is defined by anterior or cranial extending opposite and upper side extensions 72 and 74, which are positioned to wrap around the dog's shoulders (see FIG. 20B), and a transversely extending lower extensions 76 and 78 that are positioned medial and caudal of the dog's forearms.

The dorsal panel 52 and ventral panel 70 are adjustably interconnected with flat woven flexible webbing, slide adjusters and buckles to allow the harness to be precisely and snugly adjusted for the shape of the particular dog 2 on which the harness is to be fitted, and to accommodate dogs of varying sizes and body shapes. More specifically, the side portions 56 and 58 of dorsal panel 52 are adjustably connected to the respective transversely extending lower extensions 76 and 78 of ventral panel 70 with buckles 80, the female parts of which are attached to the side portions 56 and 58 in a conventional manner, and the male parts of which are attached to webbing 82 that is attached to lower extensions 76 and 78 of ventral panel 70. Similarly, the anterior corners of panel 60 and 62 of dorsal panel 52 are interconnected to the respective side extensions 72 and 74 of the ventral panel 70 with flat woven flexible webbing 82 that includes a slide adjuster 84. Thus, the cranial portions of the dorsal and ventral panels are connected to the matching respective distal left and right corners, to form an adjustable circumferential loop about the guide dog neck in a position cranial to the forearm. Likewise, the caudal portions of the dorsal and ventral panels are connected, between the matching respective distal left and right corners, to form an adjustable circumferential loop about the chest of the guide dog in a position caudal to the forearm. Those of skill in the art will readily recognize that there are many equivalent structures that allow adjustable interconnection of the dorsal panel 52 to the ventral panel 70.

When the harness 50 is fitted to the dog as shown in FIG. 20A and adjusted with the buckles 80 and slide adjusters 84 so that the harness is snug on the dog, the harness 50 forms an adjustable circumferential loop about the dog's neck in a position cranial to the forearm, and in which the harness 50 defines a longitudinal axis aligned with the X axis. The posterior portions of the dorsal and ventral panels 52 and 70 are connected as described and shown in the drawings, between the matching respective corners as described above and shown in the drawings, to form an adjustable circumferential loop about the chest of the guide dog in a position caudal to the forearm. It is preferred that the adjustable circumferential chest loop is easily opened at the buckles 80 for installation and removal of the guide dog harness 50 during use.

With reference now to FIG. 7B, a cross sectional view taken along the line A-A of FIG. 7A shows a more detailed view of the shaped guiding dog harness 50 to illustrate details of the material types and construction. The shaped ventral panel 70 is preferably and exemplarily constructed from three layers comprising an inner lining material 86, an outer shell material 88 and a layer of foam 90 located between the inner lining material 86 and the outer shell material 88. The foam material 90 is preferably and exemplarily a closed cell cross-linked polyethylene foam of a density range from five hundredths (0.05) to one tenth (0.1) grams per cubic centimeter and of a thickness range from two (2) to five (5) millimeters. The inner lining material 86 and the outer shell material 88 are preferably and exemplarily a woven textile exhibiting preferred properties included tear resistance, ability to be washed, resistance to holding dog hair, flexibility. An example of a textile material exhibiting preferred properties is a four hundred and twenty denier nylon rip stop weave with polyurethane coating on one face of the textile and a durable water proof surface treatment on the opposing face. Preferably, the peripheral edges of the inner lining and outer shell are stitched together in a conventional manner with the foam therebetween. The construction of the ventral shaped panel 70 as just described results in a comfortable and stable component of the shaped guiding dog harness 50 when correctly installed and adjusted.

The shaped dorsal panel 52 is preferably and exemplarily constructed from five layers consisting of an inner lining material 86 and an outer shell material 88, a foam material 90, a semi rigid board 92 and a mounting plate 94. The inner lining material 86, the outer shell material 88, and the foam 90 may be of the same materials indicated previously for use with the ventral panel 70. The semi rigid board 92 is positioned intermediately between the outer shell material 88 and the foam 90 and is preferably a high density polyethylene sheet of thickness ranging from one to three millimeters—the board 92 is desirably rigid yet able to conform to the dog's body. The semi rigid board has essentially the same overall shape as the outer shell but is positioned interiorly of the inner and outer layers, as indicated. The mounting plate 94 is positioned between the semi rigid board 92 and the foam material 90 and is preferably a 6061-T6 aluminum plate. As detailed below, the attachment mechanism 100 is directly attached to the mounting plate and to the semi rigid board. Alternately, the semi rigid board may be directly attached to the mounting plate and the attachment mechanism is separately attached directly to the mounting plate. In either case, because the semi rigid board, mounting plate and attachment mechanism are fixed together, movement of the semi rigid board caused by movement of the dog is immediately and directly transmitted to the human that is being guide. Thus, a primary function of the mounting plate 94 is to define a base interface to which the structures of the single point attachment mechanism 100 are attached to the dorsal panel 52 of harness 50, and more particularly, to the semi rigid board 92.

As further detailed below, the single point attachment mechanism 100 is attached and fixed to the mounting plate 94 and to semi rigid board 92 to define a rigid and stable interconnection between the handle 150 and the harness 50. The attachment mechanism is attached to the dorsal panel 52 at a position on the centerline of the dorsal panel 52 (the centerline is along the X axis—FIG. 5 and is substantially coextensive with the cranial-caudal axis through the dogs body—FIG. 1) and for a distance laterally from the medial plane that is preferably about the width of the overlapping area profiles of the single point attachment mechanism 100 and the mounting plate 94. The foam material 90 and the inner lining material 86 are typically not attached to the single point attachment mechanism 100. During installation and adjustment of the shaped guide dog harness 50, the minimal lateral rigid connection of the single point attachment mechanism 100 to the dorsal panel 52 via the mounting plate 94 allows the inner lining 86 and foam 90 at positions more lateral to slide or float relative to the adjacent material as the curvature radius is reduced to adequately fit the shape of the guiding dog. The ability of the adjacent materials to slide or float relative to adjacent layers results in a partially circumferential dorsal hoop structure that is stable and form fitting to the guiding dog, further resulting in the reliable capture and transmission of guiding dog movement to the single point attachment mechanism 100, and thus to the human 4 via the handle 150. As with the ventral panel 70, the peripheral edges of the inner lining and outer shell of the dorsal panel are preferably stitched together in a conventional manner with the foam, semi rigid board and mounting plate therebetween as detailed above and as shown in the drawings.

Turning now to FIGS. 10 through 15, the details of the single point attachment mechanism 100 are shown from several different views. The single point attachment mechanism 100 comprises of a clamp mechanism that is attached to mounting plate 94 and to semi rigid board 92, and which includes a clamping gudgeon receiver to which the handle 150 is attached with a pintle assembly 156.

Attachment mechanism 100 is defined by a base 102 that is attached to mounting plate 94. A lever 104 is pivotally attached to the base adjacent to a gudgeon slot 106 that extends along the Y axis. Lever 104 is pivotally attached for movement between on open position (e.g., FIGS. 11, 12) in which the gudgeon slot is open, and a closed position (e.g., FIGS. 14, 15) in which the gudgeon slot is closed such that a pintle pin associated with handle 150 is captured in the slot 106. A pair of fingers 108 adjacent the pivotal attachment between the lever 104 and base 102 are linked to lever 104 and when the lever 104 is moved between the open and closed positions the fingers 108 open and close the slot: when the lever is in the open position the fingers 108 are in a first position such that they are clear of the gudgeon slot 106 so that a pintle may be inserted into the slot—the gudgeon slot is open; when the lever is in the closed position the fingers 108 are moved into a second position in which the fingers extend over the gudgeon slot to thereby capture a pintle pin securely in the slot.

Gudgeon slot 106 extends along an axis that is parallel to the Y-axis. As detailed below, the combination of the attachment mechanism 100 and the handle 150 provide adjustable angular positioning of the human guiding handle 150 about the Y-axis of the harness 50. The structure of the attachment mechanism 100 and the manner in which handle 150 is interconnected to the attachment mechanism prevents movement of the handle about the X-axis and the Z-axis but allows the elevation of the handle to be adjusted about the Y-axis. Additionally, the interconnection between the attachment mechanism 100 and the handle 150 provides a positive mechanical coupling of the handle along the X-axis and the Y-axis and the Z-axis of the harness. The freedom of angular positioning of the handle 150 about the Y-axis and positive mechanical coupling about all other degrees of freedom relative to the harness 52, as provided by the configuration of the attachment mechanism 100 is important to the function and communication of guide dog movement as captured by the harness 50 and positively mechanically coupled to the human being guided by the adjustable human guiding handle 150 so that movements of the dog 2—even very slight movements—are transmitted to the human 4 through the handle 150. A single point attachment mechanism 100 as illustrated and described provides the advantage of reliable positive directional communication from the guide dog to the user, in addition to easy detachment and reattachment during use, for example, when a user and guide dog enter and exit a transportation vehicle.

Those of skill in the art will recognize that there are other equivalent structures that may be utilized to interconnect a handle 150 to a harness 50 with the same functionality as described with the illustrated embodiment.

Handle 150 is now described with particular reference to FIGS. 16 through 17, and FIGS. 18A through 18D. Generally, handle 150 is defined by an elongate shaft 152 having a handle 154 at the proximal end of the shaft 152 and a pintle assembly 156 at the distal end of the shaft. The pintle assembly 156 defines the mechanism by which the handle 150 may be attached to the attachment mechanism 100. Assembly 156 comprises a generally Y-shaped yoke 158 with opposed and forwardly extending arms 160. A cylindrical pintle 162 is attached between the arms 160. As detailed below, when handle 150 is secured to attachment mechanism 100 the pintle 162 is retained in the gudgeon slot 106 such that the pintle 162 is coaxially aligned with the Y axis. Y-shaped yoke 158 has a closed arcuate slot 164 formed therein and a pivot bore 166 immediately anteriorly of the arcuate slot (best shown in FIGS. 14 16 and 17). A fastener 168 extends through an aligned bore 171 in handle shaft 152 and defines a pivot axis for the handle shaft 152. Likewise, a fastener 170 extends through a bore in the shaft 152 and through arcuate slot 164. The fastener 170 travels in arcuate slot 164 as shaft 152 pivots at the pivot axis defined by fastener 168 so that the ends of the closed arcuate slot act as travel-limits to restrict the degree of pivot of the shaft 152 about the pivot axis at 168. This allows handle 150 to pivot about the pivot point defined by the fastener 168 through an arc of about sixty degrees as shown with arrow A in FIG. 17, although the amount of pivot may be varied by lengthening or shortening the length of arcuate slot 164. Further, the handle 150 may be raised and lowered along the Z axis as illustrated with arrow A in FIG. 19B. As noted, the length of the arcuate slot 164 directly controls the degree of angular adjustment that may be made.

Figure 16:
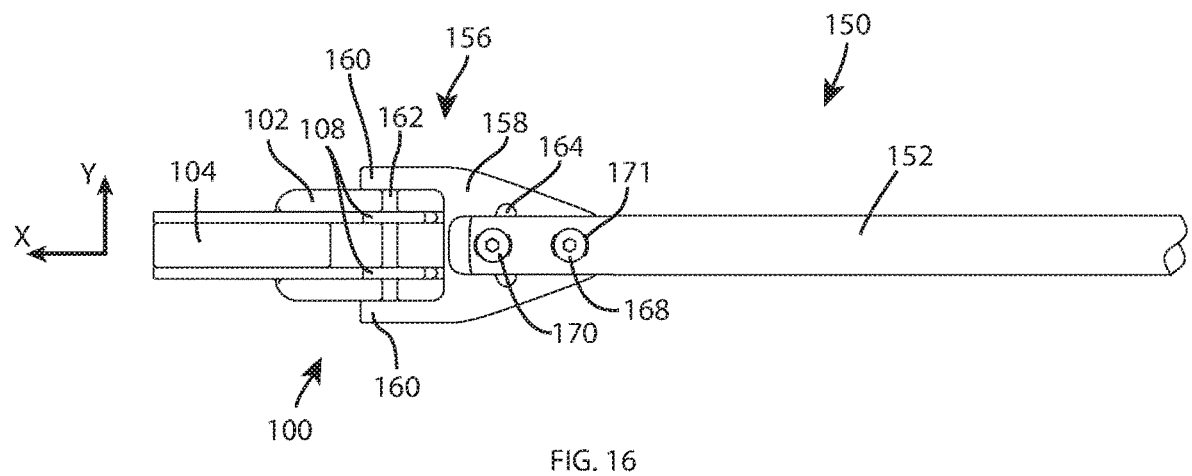
FIG. 16 is a top plan view similar to FIG. 13 and showing the handle shaft distal end attachment point with the pintle portion of the attachment mechanism, illustrating the major longitudinal axis of the handle shaft alighted axially with a longitudinal axis through the dog's body (from head through tail).
Figure 17:
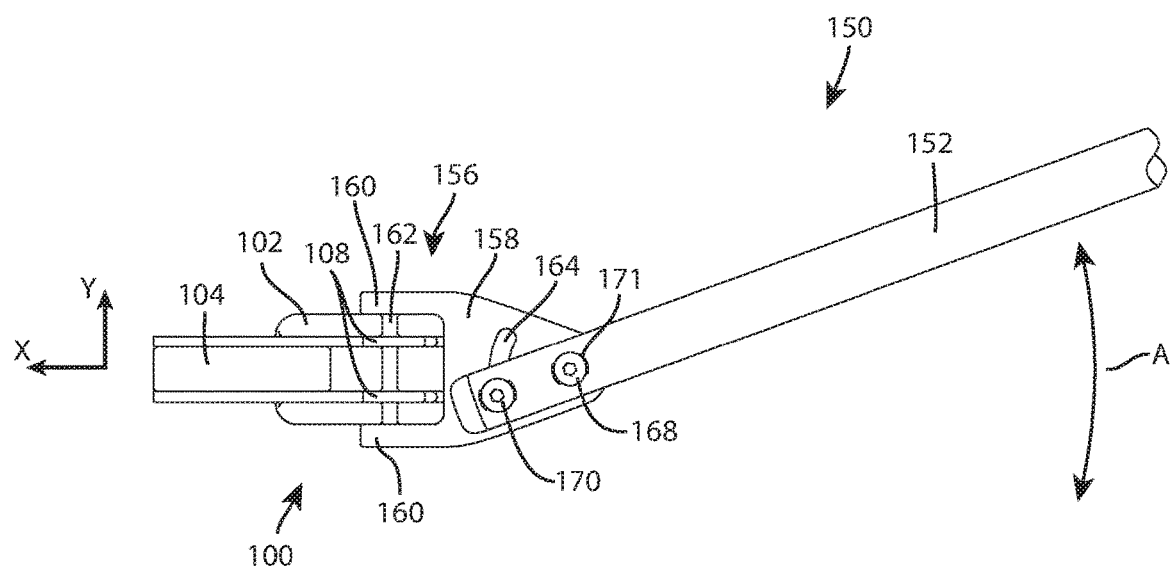
FIG. 17 is a top plan view similar to FIG. 16 except illustrating the handle rotated by about thirty degrees relative to the perpendicular orientation shown in FIG. 16.

Fasteners 168 and 170 define an angular position lock that allows the user to set and fix the angle of the handle shaft 152 relative to the Y-shaped yoke 158, which is fixed relative to the attachment mechanism 100 when the pintle is attached to the attachment mechanism. More specifically, one or both of the fasteners 168 or 170 may be tightened to lock the position of the shaft 152 relative to the Y-shaped yoke. The neutral angular orientation is defined as illustrated in FIG. 16 and FIGS. 18A and 18B and is at the zero degree neutral angular position when the cylindrical pintle pin 162 is captured in the gudgeon slot so that the pintle is oriented at ninety degrees perpendicular to the major axis of the elongated shaft 152 and the major axis of the shaft 152 is parallel to the X axis. The ability to pivot the shaft 152 about fastener 168 allows for the angular adjustment and locking of the handle 152 relative to the axis of the pintle pin 162 within a range of zero degrees—the neutral angular position (e.g., FIG. 16), plus and minus thirty degrees relative to the either side of the neutral angular position (e.g., FIG. 17). This allows the user to adjust the angular orientation of the handle relative to the axis of the pintle to find the optimal position of the guiding dog to the user for optimum guiding communication and comfort. When the user finds the best angular position between dog and user, that position may be fixed by tightening one or both fasteners 168 and 170 to prevent further pivoting of the shaft relative to the Y-shaped yoke 158.

The handle 154 is attached to the proximal end of shaft 152 and defines an ergonomically shaped handle that may be rotationally adjusted relative to shaft 152. A handle clamping mechanism 172 is pivotally attached to handle 154 at a pivot 174 and is movable between a clamped position (solid lines in FIG. 18A) in which the clamping mechanism bears on the shaft 152 to prevent relative rotation of the handle to the shaft, and an unclamped position (phantom lines in FIG. 18A) in which the clamping mechanism is loosened from the shaft 152 so the handle 154 may be rotated on the shaft 152. The user unclamps the handle by moving the clamping mechanism 172 to the open position, rotating the handle to the desired position and then re-clamping the mechanism 172 to lock the handle relative to the shaft 152. Moreover, in the unlocked configuration shown by the phantom lines in FIG. 18A, the handle 152 may slide linearly along the major axis of the shaft 152 between minimum and maximum positions to adjust the length of the handle 150. Thus, the length of the handle 150 shown in FIG. 18A is at a minimal position and the length of the handle shown in FIG. 18B is at a maximal position.

An alternative form of a handle clamping mechanism 172 is illustrated in FIG. 18E. There, handle clamping mechanism 172 is pivotally attached to handle 154 at a pivot 174 at a point distal relative to the attachment shown in FIG. 18A, and is movable between a clamped position (solid lines in FIG. 18E) in which the clamping mechanism bears on the shaft 152 through a strap 176 to prevent relative rotation of the handle to the shaft, and an unclamped position (phantom lines in FIG. 18E) in which the clamping mechanism, strap 176, is loosened from the shaft 152 so the handle 154 may be rotated on the shaft 152. The user unclamps the handle by moving the clamping mechanism 172 to the open position, rotating the handle to the desired position and then re-clamping the mechanism 172 to lock the handle relative to the shaft 152. Moreover, in the unlocked configuration shown by the phantom lines in FIG. 18E, the handle 152 may slide linearly along the major axis of the shaft 152 between minimum and maximum positions to adjust the length of the handle 150. Thus, the length of the handle 150 shown in FIG. 18E is at a minimal position and the length of the handle shown in FIG. 18B is at a maximal position.

As noted above, the relative terms clockwise and counterclockwise are defined with reference to the view of the dog 2 from its head toward its tail. In FIG. 18A the handle 154 is in the rotational position that is defined as the "zero-degree" reference angle. In FIG. 18B the handle 154 is rotated ninety degrees counterclockwise (or 270 degrees clockwise) relative to the handle position shown in FIG. 18A, In FIG. 18C the handle 154 is rotated ninety degrees clockwise relative to the position of the handle shown in FIG. 18A. And in FIG. 18D the handle is in the same rotational position as shown in FIG. 18B. Regardless of the particular length and rotational position of the handle that a user finds most appropriate, the lock defined by clamping mechanism 172 positively fixes both the length and rotational position of the handle 154 relative to the shaft 152.

Figure 15:
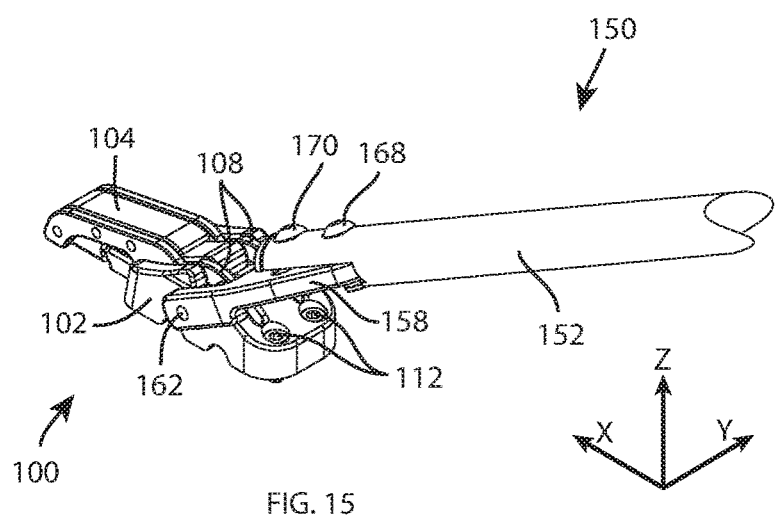
FIG. 15 is a top perspective and left, rear side view of the clamping mechanism and handle shown in FIG. 13.

FIGS. 19A and 19B illustrate, from a side elevation view, the guide dog harness apparatus system 10 according to the invention with the three major components assembled, that is, the shaped guide dog harness 50, the single point attachment mechanism 100 and adjustable human guiding handle 150. As noted above, the attachment mechanism 100 is attached to mounting plate 94. As shown in FIG. 15, base 102 of attachment mechanism 100 includes multiple bores 112 (two of which are shown in FIG. 15). The attachment mechanism 100 is attached to mounting plate 94 with fasteners that extend through bores 112 to mating bores in the attachment plate—typically appropriate fasteners may be, for instance, rivets or bolts and the like. As explained above, the fasteners also extend through the semi rigid board 92 so that the attachment mechanism 100, the mounting plate 94, and the semi rigid board 92 are all attached to and fixed relative to one another. In FIGS. 19A and 19B, the handle 150 is attached to the attachment mechanism 100. To attach the handle 150 to the attachment mechanism 100, the lever 104 is moved into the open position (e.g., FIGS. 11 and 12) to open the gudgeon slot 106. The handle 150 is then moved into proximity to the attachment mechanism so that the cylindrical pintle pin 162 is inserted into the gudgeon slot. With the pintle pin in the gudgeon slot the lever 104 is moved to the closed position (e.g., FIGS. 14 and 15). This causes the fingers 108 to move over the pintle pin and thereby capture the pintle pin in the gudgeon slot. If the user has not previously adjusted the handle's angular orientation relative to the Y-shaped yoke as described above, that position may be adjusted and fixed. It will be appreciated that with the handle 150 interconnected with the attachment mechanism 100 as illustrated and described, the handle may be pivoted about the pintle pin 162 to raise and lower the handle along the Z axis, as illustrated with arrow A in FIG. 19B, and as noted the angular orientation of the handle shaft relative to the Y-shaped yoke may be adjusted and fixed.

FIG. 19A illustrates the handle 154 adjusted to its minimum length position and rotated to an angular position of clockwise ninety degrees from the reference angle (i.e., FIG. 18A); in FIG. 19B the handle has been adjusted to maximum length and rotated 180 degrees relative to the position shown in FIG. 19A.

FIGS. 20 and 21 illustrate, from front and side elevation views, the guide dog harness 10 according to the invention in use with the harness 50 installed on a guide dog 2 and a visually impaired human 4 being guided by the dog. The length extension of the handle 150, its angular orientation and the rotational position of the handle are adjusted to the positions that best suits the user. For example, in FIG. 20A the length of handle 150 is shorter than that shown in FIG. 21A, and the handle 154 is rotated by 90 degrees relative to the position of the handle in FIG. 21A. Moreover, in FIG. 20A the handle shaft 152 is adjusted so that it is roughly parallel to the X axis—that is, parallel to the longitudinal axis through the dog's body from head to tail and therefore perpendicular to the axis of pintle 162 as captured in the gudgeon slot of attachment mechanism 100. In contrast, in FIG. 21A the handle shaft 152 has been adjusted (as described above) so that it is fixed at an angle relative to the X axis. This difference in the position of the handle shaft has a significant effect on the position of the dog 2 next to the human 4. Specifically, as in FIG. 20A with the shaft 152 parallel to the X axis the dog is positioned close to the human 4. But when the shaft 152 is oriented at an angle relative to the X axis the dog is positioned further away from the human (FIG. 21A). The position between the dog and the user may thus be adjusted according to the team's desires. FIGS. 20A and 20B thus illustrate the guide dog harness apparatus 10 adjusted and locked to place a visually impaired human 4 more medial and more cranial relative to the guide dog 2 and with a horizontal hand position for user preferred comfort. FIGS. 21A and 21B illustrate the guide dog harness apparatus 10 adjusted and locked to place a visually impaired human 4 user more lateral and more caudal relative to the guide dog 2 and with a vertical hand position for user preferred comfort.

The present invention allows the visually impaired human 4 to adjust and lock the angular orientation of the handle relative to the axis of the dog's body, and to adjust the linear and rotational position of the ergonomic handle body 154. Because the handle 150 is tightly engaged by the attachment mechanism 100, which in turn is fixed to the attachment plate 94 and semi-rigid board 92 of harness 50, even subtle and minor movements of the dog are immediately transmitted to the user through the handle. The ability to transmit even subtle and minor movements greatly improves the team communication over prior guide dog harnesses. More specifically, as the dog's body moves the movement is transmitted to the semi rigid board 92. Because the board 92 is fixed to the attachment member 100 (through mounting plate 94) and the handle 150 is rigidly (and adjustably) attached to the attachment member 100, the dog's motion is immediately communicated to the human through the handle. Even very slight and subtle movements of the dog are communicated to the human, greatly improving the ability of the human to respond to the dog's "instructions."

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

We claim:

1. A guide dog harness comprising:
   a harness comprising a semi-rigid sheet and having a centerline;
   a handle attachment member attached to the harness and the semi-rigid sheet along the centerline and including a pintle-receiving slot extending transverse to the centerline, a clamp movable between a first position in which a pair of fingers are retracted from the pintle-receiving slot so that the pintle-receiving slot is upwardly open in the first position, and a second position in which the fingers extend over and close the pintle-receiving slot; and
   a handle assembly having a shaft, a user-handle at a proximate end of the shaft and a yoke pivotally attached at a distal end of the shaft, the yoke having opposed first and second yoke arms and a pintle extending between and attached to the respective first and second yoke arms, and wherein the pintle is inserted into the pintle-receiving slot when the clamp is in the first position and the pintle is captured in the pintle-receiving slot when the clamp is in the second position such that the pintle remains transverse to the centerline when the pintle is captured in the pintle-receiving slot; and
   wherein the handle is pivotal to and fixed in a desired position relative to the yoke.

2. The guide dog harness according to claim 1 in which the handle attachment member further comprises a lever selectively movable between a first position in which the slot is open and a second position in which the slot is closed.

3. The guide dog harness according to claim 2 wherein when the lever is in the first position the pair of fingers are retracted from and clear of the pintle-receiving slot so that the pintle may be inserted in and removed from the slot and when the lever is in the second position the pair of fingers extend over and close the pintle-receiving slot so that the pintle is captured in the pintle-receiving slot.

4. The guide dog harness according to claim 3 wherein when the pintle is captured in the pintle-receiving slot the shaft may be pivoted at a pivot point proximate the distal end of the shaft and fixed at a desired angle relative to the centerline.

5. The guide dog harness according to claim 4 wherein the handle may be pivoted through an arc of about 60 degrees.

6. The guide dog harness according to claim 1 wherein the harness further comprises a dorsal panel and a ventral panel adjustably interconnected to one another.

7. The guide dog harness according to claim 6 in which the dorsal panel comprises an inner layer and an outer layer and an intermediate layer defined by a semi-rigid sheet and wherein the handle attachment member is attached to the semi-rigid sheet.

8. The guide dog harness according to claim 7 in which the semi-rigid sheet is movable relative to the inner layer.

9. The guide dog harness according to claim 8 in which the harness is bilaterally symmetrical and the ventral panel is adjustably interconnected to the dorsal panel to thereby define a circumferential loop.

10. The guide dog harness according to claim 1 in which the shaft is cylindrical and the user handle is attached to and rotatable around the shaft.

11. The guide dog harness according to claim 10 in which the rotational position of the user handle relative to the shaft is fixed.

12. The guide dog harness according to claim 11 wherein the user handle further comprises a handle clamp movable between an unclamped position in which the user handle may be rotated relative to the shaft and a clamped position in which the user handle is fixed relative to the shaft.

13. The guide dog harness according to claim 12 wherein the user handle is extensible along the shaft.

14. The guide dog harness according to claim 13 wherein the handle clamp fixes the position of the user handle along the elongate shaft.

15. A guide dog harness comprising:
    a harness body comprising a semi rigid sheet, wherein the harness defines a major axis;
    a handle mount connected to the semi rigid sheet and having a pintle-receiving slot extending transverse to the major axis and a clamp movable between a first position in which a pair of fingers are retracted from the pintle-receiving slot and the slot is open, and a second position in which the fingers extend over and close the pintle-receiving slot;
    a handle having a yoke with opposed arms and a pintle mounted between the opposed arms, and a shaft pivotally attached to the yoke, wherein the pintle is inserted into the pintle-receiving slot when the clamp is in the first position and the pintle is captured in the pintle-receiving slot when the clamp is in the second position and the pintle remains transverse to the major axis when the pintle is captured in the pintle-receiving slot,
    wherein the handle is pivoted to a desired position relative to the yoke and fixed in the desired position.

16. The guide dog harness according to claim 15 wherein the harness further comprises a dorsal portion and a ventral portion that is adjustably connected to the dorsal portion, and the dorsal portion includes inner and outer layers and wherein the semi-rigid sheet is intermediate between the inner and outer layers of the dorsal portion and the handle mounting member is not attached to the inner layer of the dorsal portion.

17. A guide dog harness comprising:
    a harness having a dorsal portion adjustably interconnected to a ventral portion and the dorsal and ventral portions together defining a circumferential loop adapted for encircling a dog's body and in which the harness defines a longitudinal axis that is aligned with a medial plane of a dog upon which the harness may be worn the dorsal portion including a semi-rigid sheet;
    a user handle having a distal end with a yoke having opposed arms with a pin extending between the opposed arms;
    a user handle attachment member attached to the harness and the semi-rigid sheet and having an upwardly open slot transverse to the longitudinal axis for receiving the pin, the slot being closable by a pair of fingers that in a closed position extend over the slot for fixing the pin to the user attachment member to thereby attach the user handle to the user handle attachment member such that the pin remains transverse to the longitudinal axis, and the slot being openable by the pair of fingers retracted from the slot; and wherein the user handle is pivotal to and fixed in a desired position relative to the yoke.

18. A guide dog harness comprising:

a harness adapted for being worn by a dog, the harness having a major axis aligned with a longitudinal axis of the dog and the harness comprising a semi-rigid sheet;

handle attachment means for connecting a handle to the harness, the handle attachment means connected to the to the harness and the semi-rigid sheet and comprising an upwardly open slot transverse to the longitudinal axis for receiving the pin, the slot being closable when a pair of fingers are extended over the slot and the slot being openable when the pair of fingers are retracted from the slot;

a handle having a shaft, a user-handle at a proximate end of the shaft and shaft attachment means at a distal end of the shaft for interconnecting the handle to the handle attachment means, wherein the shaft attachment means comprises a yoke at the distal end of the shaft, the yoke having opposed arms with a pine extending between and attached to the arms and the pin is adapted for insertion into the slot when the fingers are retracted from the slot and the pin is retained in the slot, transverse to the longitudinal axis, when the fingers are extended over the slot such that the slot is closed, and the shaft attachment means further allows the handle to pivot around a shaft pivot axis that is perpendicular to the longitudinal axis; and wherein the handle is fixed to the shaft attachment means so that the handle is fixed at a desired angle relative to the longitudinal axis and pivotal rotation of the handle around the shaft pivot axis is prevented.

\* \* \* \* \*